Nov. 8, 1949     J. O. NAVONE     2,487,666
METHOD FOR RECLAIMING RUBBER
Filed Sept. 24, 1946
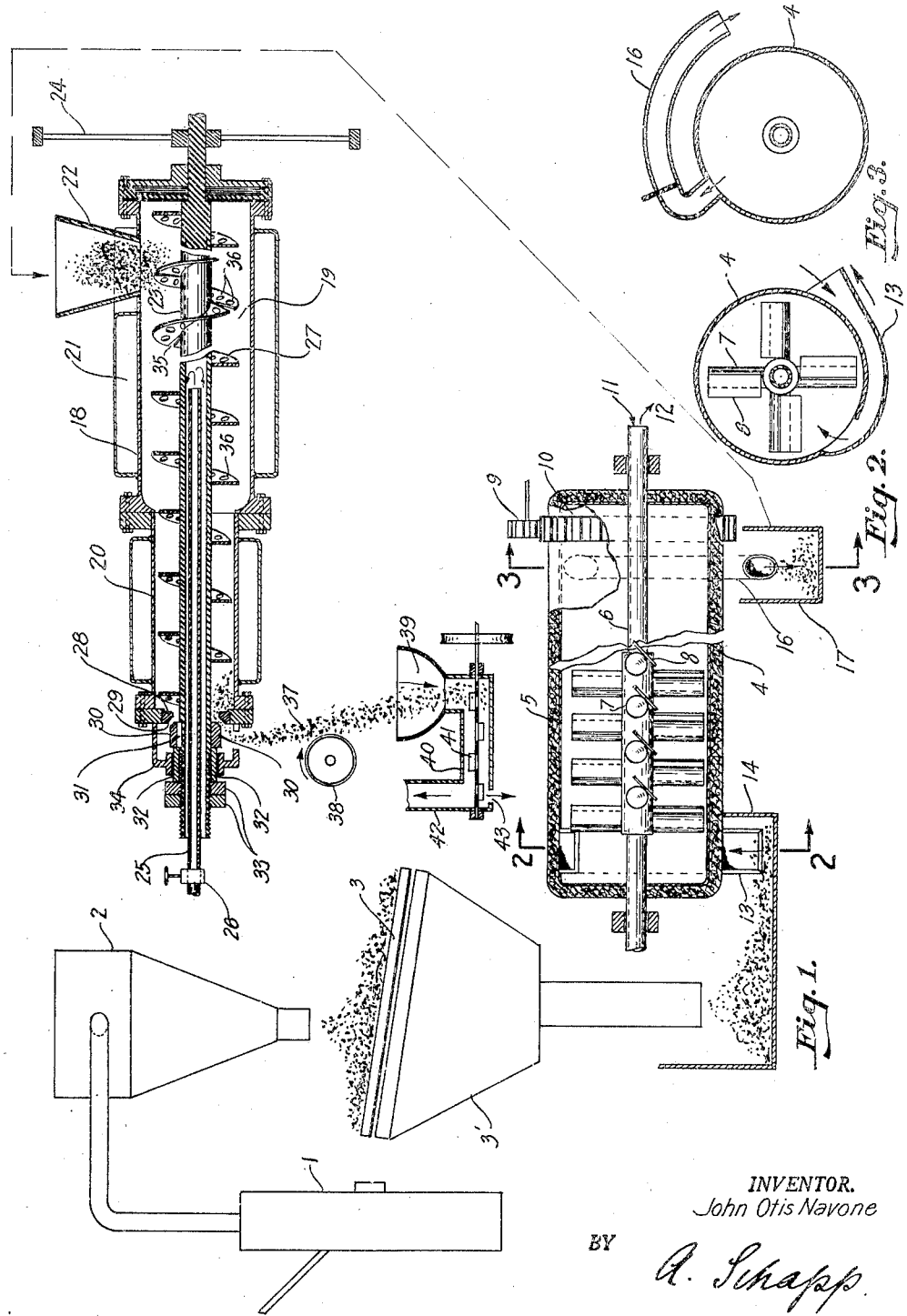
INVENTOR.
John Otis Navone
BY
A. Schapp
ATTORNEY

Patented Nov. 8, 1949

2,487,666

UNITED STATES PATENT OFFICE 2,487,666

METHOD FOR RECLAIMING RUBBER

John Otis Navone, Oakland, Calif.

Application September 24, 1946, Serial No. 699,059

9 Claims. (Cl. 260—710)

The present invention relates to improvements in a method of and means for reclaiming rubber, and has particular reference to a new method of reclaiming vulcanized rubber scrap, whether vulcanized natural rubber, vulcanized synthetic rubber, or a vulcanized mixture of the two rubbers.

The commercial method of reclaiming rubber scrap as usually practiced comprises digesting the scrap with a caustic soda solution in a closed container at a steam pressure of about 175 lbs. per square inch, for several hours, with additions of oils etc., followed by a neutralizing and washing process, being a treatment of long duration, with the expense of chemicals and a problem of disposal of waste liquors. All cotton is lost, some rubber is lost, and the quality of the reclaimed product is harmed for some purposes by the long heating and chemical action and dilution by oils, if added.

The general purpose of the present invention is to overcome difficulties of the present art and provide an efficient and inexpensive method of reclaiming vulcanized rubber scrap and mixed rubber and producing a high test reclaim.

Another object lies in removing the textile fiber from such rubber scraps as contain cloth or cord and preserving this fiber as a valuable material for use in paper making and the like.

A still further object of my invention is to make the reclaimed rubber produced soft and amenable to kneading, alone, or with additions of fresh rubber, natural or synthetic, and accomplishing the softness without the use of any chemical whatever, although compounding and/or softening mediums may be added during the processing, if desired for future use.

The above and other objects of the invention are achieved by the method hereinafter disclosed, it being understood that the invention is not limited to the exact procedure described.

The preferred form of my invention is illustrated in the accompanying drawing, in which:

Figure 1 shows, partly in side elevation, and partly in section, apparatus adapted for carrying out my process; and Figures 2 and 3, sections taken along lines 2—2 and 3—3 of Figure 1.

According to the present invention the vulcanized scrap rubber is broken up by mechanical means so as to pass through a one inch screen, size being no object at present except for convenience in further storing and handling.

If the scrap worked on is pneumatic tires, or other scrap containing textile fiber, such as cloth or cord, the textile fiber is still in the broken scrap, and a mechanical means is provided to very completely remove such fiber before processing.

The removal of the textile fiber is accomplished in the following manner: The aforementioned broken up scrap, after magnetic separation to remove stray iron, is ground in a special hammer mill 1 to about ten mesh size. While the screen size is not critical, the process should be carried to the point where all cloth and cord is frayed or beaten out, so that no twisted thread remains, although remaining fibers may have considerable length. The comminuted material is continually removed from the hammer mill by a current of air which feeds the material to a cyclone separator 2 arranged to drop out the rubber particles and frayed fiber while the air passes out the cyclone exhaust.

This whole mass of rubber particles and frayed fiber is fed on a screen 3, which may be about ten mesh, and which is operated either by shaking, vibrating or revolving. The textile fibers gather together, roll and ball up and stay on the screen for final discharge over an edge thereof, and are thus separated from the rubber particles which pass through the screen and into the hopper 3'.

The textile fiber which passes off the screen is thus recovered as a product of value. A further air cleaning step may be used for removing the last of the textile fiber lint from the rubber particles which passed through the screen.

My process of devulcanizing and reclaiming rubber needs no steam or water in contact with the material under treatment, but since some moisture is always present and the reclaimed rubber to be used in manufacture must be dry, a drier 4 is here interposed, in which the finely divided scrap rubber is dried at a heat of substantially 302° F. for about two hours, the time needed for the material to pass through the drier.

The drier 4 is here illustrated as comprising a rotary drum about fourteen feet long, with an inside diameter of about twenty-six inches, heat-insulated in its outer walls, as at 5, and provided with a hollow central shaft 6 which rotates with the drum. The hollow shaft has four sets of heating pipes 7 projecting therefrom, the heating pipes being arranged in pairs placed at right angles to one another, and are provided with angular blades 8 adapted to move the charge while the drum rotates.

The drum is revolved by means of a pinion 9 driving a gear wheel 10 on the drum. Steam is admitted into the hollow shaft, as at 11, and the water of condensation is removed, as at 12. Material is fed into the drum through a scoop 13 provided on the drum at one end thereof and dipping into a box 14 that receives its charge from the screen 3 through a hopper 3'. The treated material leaves the drum through an outlet scoop 16 provided at the opposite end for discharge into a hopper 17.

The heating process not only dries the material, but also softens it and places it in better condition for the kneading process to be described hereinafter. The heat indicated is about the safe limit, since more heat would start internal chemical action producing more heat which, if uncontrolled, would result in a solid mass of over-heated, fused material which would turn solid when cooled.

The dried scrap rubber, after magnetic separation (not illustrated) to remove stray iron, is then fed into a special kneading and mixing mill, preferably after cooling. This kneading mill is fed continuously and discharges continuously and comprises in its principal features, a stationary cylindrical barrel 18 having a relatively large intake section 19 about thirty inches in length and eight inches in diameter, and a smaller discharge section 20 about sixteen inches in length and six inches in diameter, the shell of the barrel being water-jacketed, as at 21. The intake end of the barrel has a receiving hopper 22.

A hollow shaft 23 extends lengthwise through the center of the barrel, and is rotated, at the rate of 18 R. P. M. by means of a gear wheel 24.

A flow of cooling water is admitted into the shaft through pipe 25 and is discharged in a return flow around the pipe. The flow may be regulated by means of a suitable valve 26.

The shaft, which may have a three inch diameter at the ends, is formed with a hub about four and one-half inches in diameter inside the barrel and has a worm 27 mounted thereon and extending through the length of the barrel. The worm in the larger section has a flight or width of about one and one-half inches so as to leave a quarter of an inch clearance between the worm and the inside of the barrel. The worm in the smaller section is also proportioned to leave approximately one quarter of an inch clearance with the barrel wall.

The discharge end of the barrel has an annular die ring 28 mounted therein in concentric relation to the shaft, and the ring, which is made of hard steel, is formed with a tapered seat 29.

The shaft 23 has a ring 30 slidable on keys 31 and adapted for cooperation with the seat 29 in forming a finely adjustable discharge opening which allows the material to pass with a grinding action. The ring 30 may be adjusted by operation of a sleeve 32 slidable on the shaft by means of a pair of nuts 33. The sleeve 32 is supported in a bracket 34 secured upon the end of the barrel and forms a bearing for the shaft.

The worms may be formed with breaks 35 or holes 36, or both, for better kneading action, and the worm in the larger section is preferably made of steeper pitch than that in the smaller section to induce a certain amount of counterflow.

The mill, as now constructed, holds approximately forty pounds of material, and discharges substantially one hundred and eighty pounds per hour, which means that the average transit period of the material is approximately thirteen minutes.

The barrel discharge, indicated at 37, is made to pass a magnetic separator 38, and the non-metallic rubber particles drop into a chute 39 connecting with a horizontal passage 40 having a slowly rotating paddle shaft 41 therein. The paddle shaft stirs the rubber particles and keeps them from sticking and burning while they are being conveyed to a vertical conduit 42 leading to a cyclone separator (not shown). The material is delivered to the separator by an air blast passing through the chute 39 and through the passages 40—42, which immediately cools the material particles.

The vertical conduit 42 is provided with an opening 43 at its lower end to discharge material too heavy to be carried by the air blast.

In operation, the material coming from the drier is fed into the hopper 22. It may be fed in the heated condition in which it comes from the drier, but, for some purposes, it is preferably fed in a cooled condition, say about 100° F. The feed is continuous, and so is the discharge. Within the barrel the material is crowded forward by the spiral. But, since the spiral in the larger section feeds faster than the spiral in the smaller section, and the discharge is limited to a comparatively small opening at the tapered seat 29, portions of the material are crowded backward continuously, around the rim of the worms, and through the breaks and perforations in the worms, whereby a mixing and kneading effect is produced.

This kneading effect produces internal friction accompanied by generation of heat and chemical action, and the heat is continuously removed by the cooling effect of the water in the cooling jackets and inside of the shaft, the flow of which may be controlled to produce the desired cooling effect.

The temperature of the material fed could not be above 302° F., the discharge heat of the drier, but in practice would hardly ever be over 200° F., and may, of course, be room temperature, that is about 60° F. For general operation it does not make much difference at what temperature the material is fed, in the above range, since heat is continuously removed in the kneading mill and the flow of water may be adjusted to remove the required amount of heat.

In spite of the removal of heat units, the temperature, under usual working conditions, will rise toward the discharge end of the mill to about 400° F., due to internal friction. The heat may also be controlled, to some extent, by a change in the speed of the worm.

An experienced operator will soon establish certain danger signs of excessive heat. Where a radiator is used for cooling the water and the water begins to boil, this is a sign of excessive heat. Or, when the discharged material emits gases or vapors violently, identified by odor as being of the order of $SO_2$, $H_2S$, $CS_2$ or mercaptans, this again is a sign of excessive heat.

A certain amount of chemical action, accompanied by liberation of gases, no doubt takes place in this process, but I believe that the principal change is of a physical character due to friction and kneading.

An important factor of my process is the rapid cooling after discharge. The material is discharged from the kneading mill in small, thin, stringy or granular form. Since the revolving ring or die 30 has a grinding action against the tapered seat 29, there can be no clogging of the material. The extruded material passes the magnetic separator 38 and is then picked up by the air current leading to the cyclone separator whereby it is cooled immediately and whereby further chemical action is stopped.

The upward air current also acts as an air separator, any heavy particles dropping out the bottom hole 43, while the lighter, cooled reclaimed rubber particles pass upward and are dropped out by the cyclone separator, and the now heated air passes out through the cyclone exhaust, through the fan blower which produces the air current, and is discharged.

This continuous kneading machine can perform its reclaiming duty with no additions whatever to the ground and dried vulcanized rubber scrap fed to it, but in practice, to increase allowable speed and capacity, and especially upon such heavily loaded or filled material as tire tread buffing dust, a procedure is adopted, which adds nothing in weight or dilution to the reclaimed product, but lubricates the operation, so that less power is needed and less heat is produced, at the same time temporarily partially dissolving the rubber material in process.

This can be done because it is a natural function of this worm mill for the harder stronger part of the material operating to force any softer weaker material back toward the feed end, while the harder parts crowd along the worm toward the discharge end, and if and when this harder material becomes soft, it may be forced back toward the feed end by fresher stock with which it mixes and later is discharged through the discharge die.

This also works similarly with vapors in the mill. They are forced back toward the feed end, may be condensed in cooler fresh-fed material and return toward the discharge absorbed in this material and may be again vaporized and travel toward the feed end to condense ad infinitum.

Use is made of the action just described in this way: Hydrocarbon solvent of no particular formula, but having boiling points such that it can be vaporized in the heat of the continuous mill, is mixed with the dried prepared rubber scrap being fed into the mill, and this solvent is vaporized somewhere in the hot central part of the mill and moves toward the feed end and condenses in fresh-fed material. Thus, a small amount of solvent continually reused partially dissolves the material in process, lubricates it, decreases the power needed and the heat produced, aids the mixing and results in greatly increased capacity.

A very little hydrocarbon remains in the reclaim and is discharged with the thin, small reclaim product and is vaporized by the heat in the discharged product as pressure is removed on discharge, and is carried off by the cooling air current which carries the reclaimed rubber to the cyclone separator.

In practice, it is found that an addition to the feed of even 1% by weight of hydrocarbon solvent, boiling range from 250° to 400° F. allows a much increased speed and capacity while a better mix and softer reclaim is produced, yet no solvent appears in the product. I have successfully used Union Oil Solvent No. 3, with boiling points between 200° and 300° F. and Union Oil Solvent No. 7, with boiling points between 220° and 330° F. Other solvents may be similarly used, the principal requirement being such boiling range that they may be eliminated from the finished product.

Various changes or modifications may be resorted to without departing from the spirit of my invention or the scope of the appended claims.

I claim:

1. In a rubber reclaiming process, the steps of spirally advancing finely divided dry scrap rubber in an elongated body of progressively decreasing cross-section and at progressively increasing pressure and with limited freedom of counterflow to produce a kneading action whereby the temperature of the material is progressively increased by friction, extruding material from the front end of the body in a grinding action, and applying an external cooling medium to the body axially and circumferentially to keep the temperature from rising above 400° F., the material being advanced at an approximate transit period of 13 minutes.

2. A process as defined in claim 1, in which a hydro-carbon solvent is fed into the body at the rear end thereof, the solvent having a boiling point below 400° Fahrenheit whereby the solvent is vaporized toward the front end of the body and is forced back by the advancing material for re-condensing and for re-entry into the material in liquid form.

3. In a rubber reclaiming process, the steps of agitating a body of finely divided scrap rubber for a period of approximately two hours and at a temperature of substantially 302° F. for drying and softening the material, and of subsequently kneading the dried and softened material for approximately 13 minutes and at a raised temperature not in excess of 400° F.

4. In a rubber reclaiming process, the steps of agitating a body of finely divided scrap rubber for a period of approximately two hours and at a temperature of substantially 302° F. for drying and softening the material, of subsequently kneading the dried and softened material for approximately 13 minutes and under pressure and at a raised temperature not in excess of 400° F., and of entraining treated particles of the material into an air draft for rapidly cooling the same.

5. In a rubber reclaiming process, the steps of spirally advancing finely divided dry scrap rubber in an elongated body of progressively decreasing cross-section and at progressively increasing pressure and with limited freedom of counterflow to produce a kneading action whereby the temperature of the material is progressively increased by friction, applying an external cooling medium to the body to keep the temperature from rising above 400° F., extruding material from the front of the body in a grinding action, and rapidly cooling the material immediately after extrusion, the material being advanced at an approximate transit period of 13 minutes.

6. In a rubber reclaiming process, the steps of agitating a body of finely divided scrap rubber at a temperature of substantially 302° F. for drying and softening the material, of subsequently kneading the dried and softened material for approximately 13 minutes and under pressure and at a raised temperature not in excess of 400° F., of extruding the kneaded material in the form of fine grindings, and rapidly cooling the grindings immediately upon extrusion.

7. In a rubber reclaiming process, the steps of spirally advancing finely divided scrap rubber in an elongated body of progressively decreasing cross-section and at progressively increasing pressure and with limited freedom of counterflow to produce a kneading action whereby the temperature of the material is progressively increased by friction, feeding a hydro-carbon solvent into the body at the rear end thereof, the solvent having a boiling point below 400° Fahrenheit whereby the solvent is vaporized toward the front end of the body and is forced back by the advancing material for recondensing and for re-entry into the material in liquid form, extruding the material from the front end of the body in a grinding action, and applying an external cooling medium to the body axially and circumferentially to keep the temperature from rising above 400° F.

8. In a rubber reclaiming process, the steps of advancing finely divided scrap rubber in an elongated body at progressively increasing pressure to produce a kneading action whereby the temperature of the material is progressively increased by friction, feeding a hydro-carbon solvent into the body at the rear end thereof, the solvent having a boiling point below 400° Fahrenheit whereby the solvent is vaporized toward the front end of the body and is forced back by the advancing material for re-condensing and for re-entry into the material in liquid form, extruding the material from the front end of the body in a grinding action, and applying a cooling medium to the body to keep the temperature from rising above 400° F.

9. In a rubber reclaiming process, the steps of kneading finely divided dry scrap rubber for approximately 13 minutes and under pressure and at a raised temperature not in excess of 400° F., of extruding the kneaded material in the form of fine grindings, and of rapidly cooling the grindings immediately upon extrusion.

JOHN OTIS NAVONE.

REFERENCES CITED

The following references are of record in the file of this patent:

UNITED STATES PATENTS

| Number | Name | Date |
|---|---|---|
| 845,851 | Case | Mar. 5, 1907 |
| 866,758 | Wheeler | Sept. 24, 1907 |
| 866,759 | Wheeler | Sept. 24, 1907 |
| 1,133,952 | Gare | Mar. 30, 1915 |
| 1,189,282 | Murdock | July 4, 1916 |
| 1,607,291 | Marie | Nov. 16, 1926 |
| 2,126,672 | Smith | Aug. 9, 1938 |
| 2,215,435 | Hale | Sept. 17, 1940 |
| 2,221,490 | Robinson | Nov. 12, 1940 |

FOREIGN PATENTS

| Number | Country | Date |
|---|---|---|
| 520,358 | Great Britain | Apr. 22, 1940 |